United States Patent
Suuronen et al.

(10) Patent No.: US 12,471,869 B2
(45) Date of Patent: Nov. 18, 2025

(54) X-RAY IMAGING SYSTEM FOR A CEPHALOMETRIC DENTOMAXILLOFACIAL X-RAY IMAGING OPERATION

(71) Applicant: PaloDEx Group Oy, Tuusula (FI)

(72) Inventors: Esa Suuronen, Kerava (FI); Antti Karhunen, Helsinki (FI); Markus Rintamäki, Tuusula (FI)

(73) Assignee: PaloDEx Group Oy, Tuusula (FI)

( * ) Notice: Subject to any disclaimer, the term of this patent is extended or adjusted under 35 U.S.C. 154(b) by 246 days.

(21) Appl. No.: 18/297,475

(22) Filed: Apr. 7, 2023

(65) Prior Publication Data
US 2023/0320680 A1 Oct. 12, 2023

(30) Foreign Application Priority Data
Apr. 8, 2022 (FI) ...................... 20225308

(51) Int. Cl.
*A61B 6/51* (2024.01)
*A61B 6/00* (2006.01)
(Continued)

(52) U.S. Cl.
CPC .............. *A61B 6/51* (2024.01); *A61B 6/0407* (2013.01); *A61B 6/06* (2013.01); *A61B 6/4452* (2013.01); *A61B 6/54* (2013.01)

(58) Field of Classification Search
CPC .... A61B 6/04; A61B 6/06; A61B 6/51; A61B 6/03; A61B 6/032; A61B 6/035;
(Continued)

(56) References Cited

U.S. PATENT DOCUMENTS 9,538,968 B2 * 1/2017 Rotondo .............. A61B 6/4078
2020/0146650 A1 5/2020 Isoaho et al.

FOREIGN PATENT DOCUMENTS

CN 212415766 U 1/2021
DE 202020104200 U1 10/2020
(Continued)

OTHER PUBLICATIONS

Finnish Patent and Registration Office Search Report for Application No. 20225308, dated Nov. 7, 2022 (2 pages).
(Continued)

*Primary Examiner* — Jurie Yun
(74) *Attorney, Agent, or Firm* — Michael Best & Friedrich LLP

(57) ABSTRACT

An X-ray imaging system (100) for a Cephalometric dentomaxillofacial X-ray imaging operation. The imaging system comprises a controller (132), an X-ray emitter (104) for emitting X-rays (106), primary and secondary collimators (108, 110) for collimating the X-rays, an X-ray receiver (124) for receiving the X-rays from the emitter, and a positioner (120) for positioning an object (102) to be imaged. The controller is configured to select (264) one of one-shot and scanning Cephalometric imaging operations and to control the emitter to emit X-ray radiation (106) and the receiver to receive the emitted radiation in order to acquire (266) an X-ray image data (ID) in the selected imaging operation.

16 Claims, 1 Drawing Sheet

(51) Int. Cl.
   *A61B 6/04*        (2006.01)
   *A61B 6/06*        (2006.01)
(58) Field of Classification Search
   CPC ... A61B 6/0407; A61B 6/4435; A61B 6/4452;
                 A61B 6/501; A61B 6/52; A61B 6/54;
                                              A61B 6/582
   See application file for complete search history.

(56) References Cited

FOREIGN PATENT DOCUMENTS

| | | |
|---|---|---|
| EP | 2609861 A1 | 7/2013 |
| EP | 2959835 A1 | 12/2015 |
| EP | 3653125 A1 | 5/2020 |
| EP | 3936050 A1 | 1/2022 |
| JP | 2004208754 A | 7/2004 |
| JP | 2007236743 A | 9/2007 |
| JP | 2017023326 A | 2/2017 |
| KR | 20220035717 A | 3/2022 |

OTHER PUBLICATIONS

European Patent Office Search Report for Application No. 23161420.7 dated Jul. 28, 2023 (2 pages).

\* cited by examiner

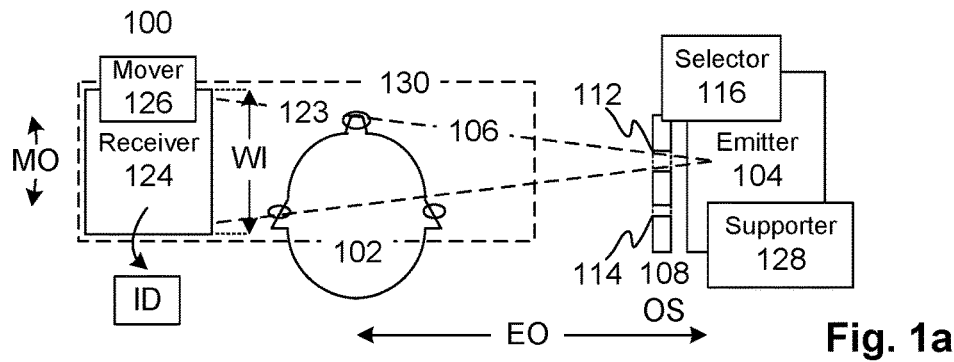
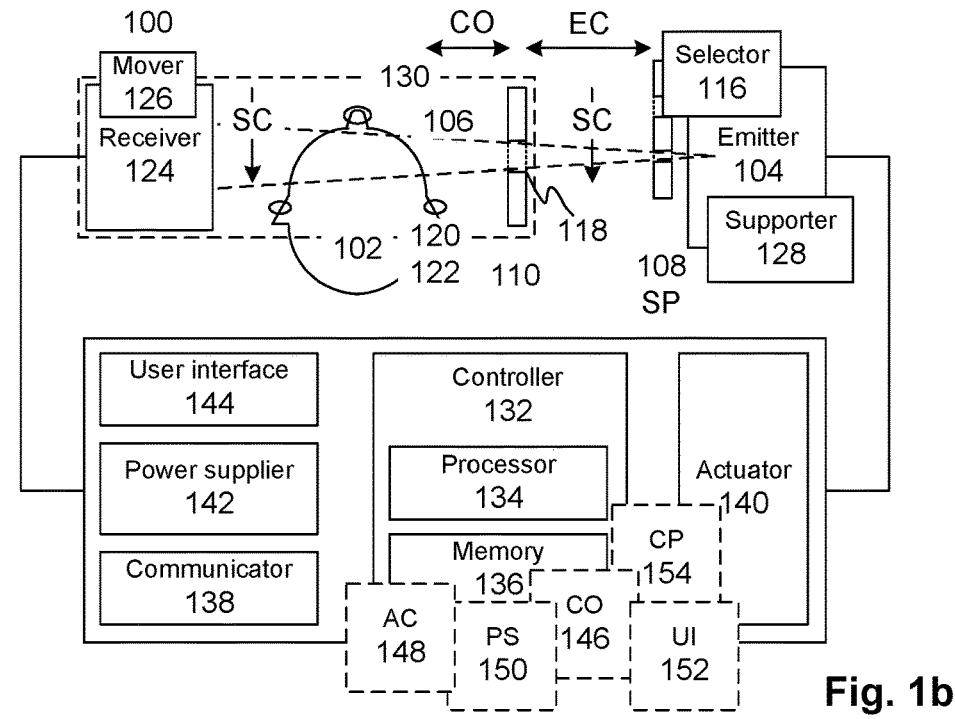
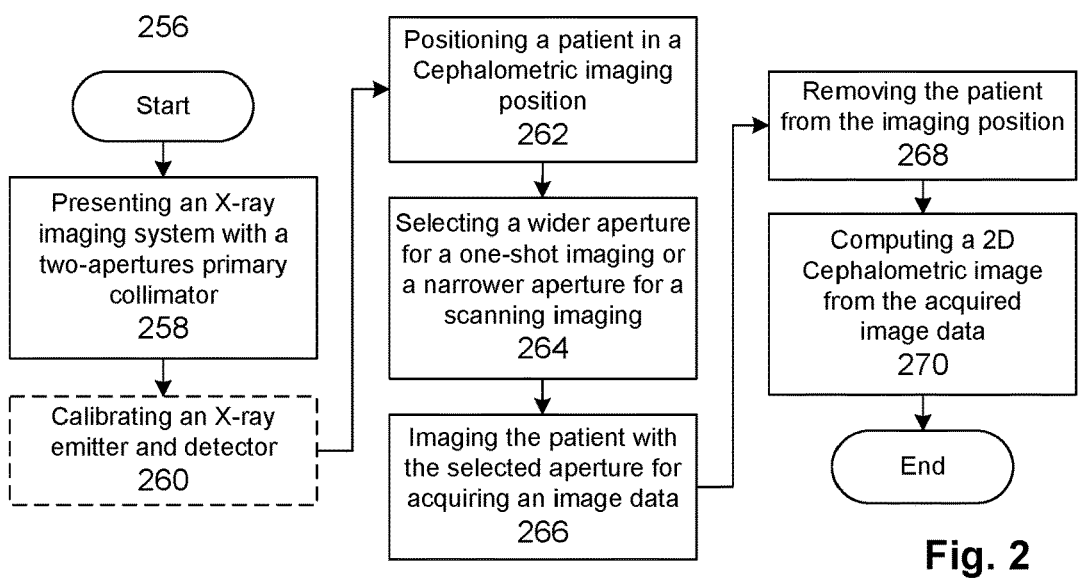

X-RAY IMAGING SYSTEM FOR A CEPHALOMETRIC DENTOMAXILLOFACIAL X-RAY IMAGING OPERATION

BACKGROUND OF THE INVENTION

The application relates generally to an X-ray imaging system for a Cephalometric dentomaxillofacial X-ray imaging operation.

Known Cephalometric X-ray imaging systems require that a patient to be imaged is positioned between an X-ray emitter and a digital X-ray sensor, whereupon it is possible to emit X-rays towards the dental area of the patient by means of the emitter and, after the X-rays have penetrated the patient, to receive the X-rays by means of the sensor. The received X-rays are converted into a form of an X-ray image data in the sensor and this image data is then used in the formation of a two-dimensional (2D) Cephalometric image from the patient.

Known one-shot (full-view) imaging systems use a fast one-shot imaging operation, wherein a wide sensor captures a whole imaging area of the patient at once. In order to capture the whole imaging area, the one-shot imaging operation requires a large sensor area from the sensor, which leads to an expensive sensor.

The known scanning imaging systems use a less-expensive scanning imaging operation, wherein a narrow sensor captures the whole imaging area in several sequential imaging area parts while the sensor and collimators follow the X-rays, which are emitted by the emitter that sweeps across the imaging area. In order to capture the whole imaging area, the scanning imaging operation requires the scanning movements of the system parts, which leads to a longer imaging operation, and this long imaging time exposes the imaging operation to movements of the patient. These movements cause artifacts to the captured image data, which leads to an increased need for image data corrections in the formation of the image and a deteriorated image quality.

SUMMARY OF THE INVENTION

One object of the invention is to withdraw the drawbacks of known systems and to provide a versatile, cost-optimized X-ray imaging system for a Cephalometric dentomaxillofacial X-ray imaging operation, which enables to carry out one-shot (full-view) and scanning imaging operations.

One object of the invention is fulfilled by providing the X-ray imaging system, X-ray imaging method, computer program, and computer-readable medium according to the claims.

Embodiments of the invention are specified by the X-ray imaging system, X-ray imaging method, computer program, and computer-readable medium according to the claims.

A first X-ray imaging system for a Cephalometric dentomaxillofacial X-ray imaging operation comprises a controller, an X-ray emitter for emitting X-rays, primary and secondary collimators for collimating the X-rays, an X-ray receiver for receiving the X-rays from the emitter, and a positioner for positioning an object to be imaged. The controller is configured to select one of one-shot and scanning Cephalometric imaging operations and to control the emitter to emit X-ray radiation and the receiver to receive the emitted radiation in order to acquire an X-ray image data in the selected imaging operation.

A second X-ray imaging method for a Cephalometric dentomaxillofacial X-ray imaging operation, which is carried out by the previous first imaging system. The imaging method comprises following steps of selecting, by a controller, one of one-shot and scanning Cephalometric imaging operations and controlling, by the controller, an X-ray emitter to emit X-ray radiation. The imaging method further comprises following steps of collimating, by at least one of primary and secondary collimators, the emitted radiation and controlling, by the controller, an X-ray receiver to receive the collimated radiation to acquire an X-ray image data in the selected imaging operation.

A third computer program comprises instructions, which, when the computer program is executed by a controller, cause the previous first imaging system to carry out at least the steps of the previous second imaging method.

A fourth tangible, non-volatile computer readable medium comprises the stored computer program, which is in accordance with the previous third computer program.

BRIEF DESCRIPTION OF THE DRAWINGS

The exemplary embodiments are described with reference to the accompanying figures:

FIG. 1a presents a principle of an X-ray imaging system in a one-shot Cephalometric imaging operation FIG. 1b presents a principle of the X-ray imaging system in a scanning Cephalometric imaging operation with further details FIG. 2 presents a flowchart of an X-ray imaging method in the one-shot and scanning Cephalometric imaging operations

DETAILED DESCRIPTION

FIGS. 1a and 1b present an X-ray imaging system 100 that is configured to acquire (capture) an X-ray image data ID from an object 102, e.g. a patient or a calibration target, in an X-ray imaging operation. The acquired image data ID is processed (computed, converted) to form an X-ray image from at least a part of the imaged object 102.

The system 100 is configured to carry out (perform, execute) at least Cephalometric X-ray imaging operation, e.g. one-shot and scanning imaging operations, which results (produces) the image data ID for the formation of a two-dimensional (2D) Cephalometric X-ray image, e.g. lateral or PosteroAnterior (PA) image, from the imaged object 102, e.g. a dentomaxillofacial area of the object 102, as the figures present.

The system 100 may further be configured to carry out a Panoramic X-ray imaging operation, which results the image data ID for the formation of a 2D Panoramic image from the imaged object 102. Additionally, the system 100 may further be configured to carry out a Computed Tomography (CT) X-ray imaging operation, which results the image data ID for a reconstruction of a three-dimensional (3D) volume from the imaged object 102.

The system 100 comprises an X-ray emitter 104 that is configured to emit (irradiate) X-rays (X-ray radiation) 106 for at least the Cephalometric imaging operation. The emitter 104 may further be configured to emit the X-rays 106 for at least one of the Panoramic and CT imaging operations.

The system 100 further comprises a primary collimator 108 and a secondary collimator 110. The primary collimator 108 is configured to collimate the emitted X-rays 106 alone in the one-shot imaging operation and in the scanning imaging operations together with the secondary collimator 110, which is configured to collimate the emitted X-rays 106 in the scanning imaging operation.

The primary collimator 108 comprises one adjustable aperture 112, which is configured collimate the X-rays 106 as a one-shot aperture in the one-shot imaging operation and as a scanning aperture in the scanning imaging operation. At least one dimension (e.g. width, height, cross-sectinal area (size)) of the adjusted one-shot aperture 112 is larger than a corresponding dimension of the adjusted scanning aperture 112. Alternatively, the primary collimator 112 comprises two apertures 112, 114 of which the larger one-shot aperture 112, which is configured to collimate the X-rays 106 in the one-shot imaging operation, has at least one dimension larger than the narrower scanning aperture 114, which is configured to collimate the X-rays 106 in the scanning imaging operation, as the figure presents.

The primary collimator 108 locates between the emitter 104 and the positioned object 102 so that the primary collimator 108 is in a vicinity of the emitter 104, or it is a part of a structure of the emitter 104, whereupon the primary collimator 108 is much closer to the emitter 104 than the positioned object 102.

The primary collimator 108 comprises at least one collimator (collimator structure), e.g. mainly-used one collimator, as previously and below has been described and as the figures present, or rarely-used at least two successive collimators (collimator structures), which have not presented in the figures. The at least two successive collimators comprise two, three, four, five, or more successive collimators.

Irrespective of a number of successive collimators in the primary collimator 108, the multiple collimators-comprised primary collimator 108 is configured to collimate the emitted X-rays 106 alone in the one-shot imaging operation and in the scanning imaging operations together with the secondary collimator 110 correspondingly as the mainly-used primary collimator 108, which comprises one collimator. Additionally, irrespective of the number of successive collimators in the primary collimator 108, the multiple collimators-comprised primary collimator 108 locates between the emitter 104 and the positioned object 102 so that the primary collimator 108 is in a vicinity of the emitter 104 or it is a part of the structure of the emitter 104 correspondingly as the mainly-used primary collimator 108.

The system 100 further comprises a selector 116 that is configured to select a larger one-shot position OS to the aperture 112 to collimate the emitted X-rays 106 in the one-shot imaging operation and a narrower scanning position SP to the aperture 112, 114 to collimate the emitted X-rays 106 in the scanning imaging operation.

If the primary collimator 108 comprises the single aperture 112, the selector 116 makes the selection by adjusting the dimension of the aperture 112 to the one-shot position OS so that the aperture 112 operates as a one-shot aperture in the one-shot imaging operation and by adjusting the dimension of the aperture 112 to the scanning position SP, which is narrower than the one-shot position OS as previously has been described, so that the aperture 112 operates as a scanning aperture in the scanning imaging operation. Alternatively, if the primary collimator 108 comprises two apertures 112, 114 as the figures present, the selector 116 makes the selection by postioning (adjusting) the primary collimator 108 so that the larger one-shot aperture 112 is correctly positioned to the one-shot position OS for the one-shot imaging operation and by positioning the primary collimator 108 so that the narrower scanning aperture 114 is correctly positioned to the scanning position SP for the scanning imaging operation.

The secondary collimator 110 comprises an aperture 118 that is configured to be used in the scanning imaging operation SP. The secondary collimator 110 locates between the emitter 104 as well as the primary collimator 108 and the positioned object 102. A distance CO between the second collimator 110 and the positioned object 102 is shorter than a distance EC between the emitter 104 and the collimator 110 so that the secondary collimator 110 is closer to the positioned object 102 than to the emitter 104 and the primary collimator 108.

The system 100 further comprises a positioner 120 that is configured to position the object 102 to be imaged in a Cephalometric imaging position. The positioner 120 comprises an indication of the imaging position (not presented) in a vicinity of the system 100 to which the object 102 takes up the position for the one-shot and scanning imaging operations. Additionally or alternatively, the positioner 120 comprises at least one of ear rods (ear supporter) 122, which are configured to be set in auditory canals of the object 102, and a nasio supporter 123, which is configured to be set against the object 102. The ear rods 122 and the nasio supporter 123 are configured to position the object 102 in the imaging position in the one-shot or scanning imaging operations.

The system 100 further comprises an X-ray receiver 124 that is configured to receive the X-rays 106 from the emitter 104 and to generate the image data ID from the positioned and X-ray exposed (imaged) object 102. The generated image data ID is then processed in the formation of the Cephalometric image from the object 102.

The receiver 124 comprises a digital X-ray sensor so that the receiver 124 is configured to carry out at least the one-shot and scanning Cephalometric imaging operations. The sensor is further configured to carry out the Panoramic and CT imaging operations if such exist.

The most used area of the lateral Cephalometric image in the one-shot imaging operation is roughly from a porion of the object 102 to a tip of the nose of the object 102. This porion-nose tip distance is typically less than 16 cm. A sufficient horizontal width WI of the sensor is 16-17 cm, e.g. 16; 16,25; 16,5; 16,75; or 17 cm. The sensor with this width WI is configured to operate most Cephalometric imaging operations by the one-shot imaging operation and rare cases, which require a wider area, e.g. a whole lateral Cephalometric image area, are operated by the scanning imaging operation. Alternatively, the width WI of the sensor may be 16-20 cm, e.g. 16, 17, 18, 19, or 20 cm. Irrespective of how wide the used sensor in the system 100, the width WI is anyway significantly smaller than a full-width sensor having the width of 26 cm.

The system 100 may comprise a mover 126 that is configured to move MO the receiver 124 at least one of linearly and rotationally with respect to the emitter 104 so that the receiver 124 is perpendicularly towards the emitter 104 during the emission of the X-rays 106 for at least one of the one-shot and scanning imaging operations.

The system 100 further comprises a supporter 128 that is configured to support the emitter 104, primary collimator 108, and the selector 116 with respect to a structure of the system 100 and the supporter 128. Additionally, the supporter 128 is configured to establish a sufficient distance EO between the emitter 104 and the positioned object 102 (postioner 120). Additionally, the supporter 128 is configured to move the emitter 104 and the primary collimator 108 to their imaging position for the one-shot and scanning imaging operations and to move the primary collimator 108 and, if necessary, the emitter 104 at least one of rotationally and linearly with respect to the system 100 in accordance with the scanning movements SC during the scanning imaging operation.

If the emitter 104 is only emitter in the system 100, the supporter 128 comprises (is) a C-shaped rotator (gantry) 128. In this single-emitter embodiment, the system 100 further comprises at least a vertical column (not presented); a horizontal upper shelf (not presented); a distal Cephalometer (Cephalostat, Cephalometric imaging supporter) 130, which comprises the secondary collimator 110, the positioner 120, and the receiver 124; and actuator mechanisms for actuating the upper shelf and the rotator linearly and rotationally as other system parts.

Alternatively, if the emitter 104 is not only emitter in the system 100, the supporter 128 comprises (is) a distal emitter supporter 128 for establishing the distance EO between the emitter 104 and the positioned object 102. In this multiple-emitter embodiment, the system 100 further comprises the column; the upper shelf; the rotator (not presented), which comprises another X-ray emitter for at least one of the Panoramic and CT imaging operations (not presented), the secondary collimator 110, and the receiver 124; the distal Cephalometer, which comprises the positioner 120, and the actuator mechanisms for actuating the upper shelf and the rotator pivotally, linearly, and rotationally as other system parts.

Operations and necessary system parts of the single-emitter embodiment of system 100 have been described more accurately in the background of published patent application FI 20145617. Operations and necessary system parts of the multiple-emitter embodiment of the system 100 have been described more accurately in the detailed description of the same patent application.

The system 100 further comprises a controller 132 that is configured to control the operations of the system parts e.g. the system parts 104, 108, 110, 112, 114, 116, 118, 120, 124, 126, 128, 130, 138, 140, 142, 144 so that the system 100 operates as previously and below have been described.

The controller 132 comprises a processor 134 that is configured to carry out operator-initiated instructions, computer program (software)-initiated instructions, or both, and to process data to run computer programs (applications, softwares). The processor 134 comprises at least one processor, e.g. one, two, three, four, or more processors.

The controller 132 further comprises a memory 136 that is configured to store and to maintain data. The data may be instructions, computer programs, and data files. The memory 136 comprises at least one memory, e.g. one, two, three, four, or more memories.

The system 100 further comprises a communicator 138 that the controller 132 is configured to control to send commands, requests, and data to at least one of e.g. the system parts 104, 108, 110, 112, 114, 116, 118, 120, 124, 126, 128, 130, 138, 140, 142, 144, e.g. the emitter(s) 104 and the receiver 124. The controller 132 is further configured to control the communicator 138 to receive commands, requests, and data from at least one of e.g. the systemparts 104, 108, 110, 112, 114, 116, 118, 120, 124, 126, 128, 130, 138, 140, 142, 144, e.g. the emitter(s) 104 and the receiver 124. The communication between the communicator 138 and e.g. the system parts 104, 108, 110, 112, 114, 116, 118, 120, 124, 126, 128, 130, 138, 140, 142, 144 is carried out through a wired connection(s), wireless connection(s), or both connections.

The system 100 further comprises an actuator 140 that the controller 132 is configured to control to actuate at least one of e.g. the system parts 104, 108, 110, 112, 114, 116, 118, 120, 124, 126, 128, 130. The actuator 140 comprises e.g. motors, drivers, actuator mechanisms, or other actuator parts.

The system 100 further comprises a power supplier 142 that the controller 132 is configured to control to power the operation of the system 100. The power supplier 142 comprises at least one supplier part configured to power the system 100, e.g. a connection to electric plugs, battery, regulator, or other supplier parts.

The system 100 further comprises a user interface (UI) 144 that the controller 346 is configured to control to receive instructions, requests, or data from an operator of the system 100. The controller 132 is further configured to control the UI 358 to present instructions, requests, or data to the operator.

The memory 136 is configured to store at least a communicator program 146 to operate (control) the communicator 138, an actuator program 148 to operate the actuator 140, a power supplier program 150 to operate the power supplier 142, and an UI program 152 to operate the UI 144.

The memory 136 is further configured to store a computer program 154 that the controller 346 is configured to execute (run) to control the operation(s) of the system 100, e.g. the operation of at least one of e.g. the system parts 104, 108, 110, 112, 114, 116, 118, 120, 124, 126, 128, 130, 138, 140, 142, 144 as previously has been described. The computer program 154 comprises computer readable code instructions.

The computer program 154 is configured to be stored in a tangible, non-volatile (non-transitory) computer-readable medium, e.g. a Compact disc (CD) or Universal Serial Bus (USB) storage device.

FIG. 2 presents an X-ray imaging method 256 to carry out the Cephalometric dentomaxillofacial X-ray imaging operation by the system 100, which has been described previously.

At step 258, the system 100 presents the emitter 104, primary collimator 108, secondary collimator 110, selector 116, receiver 124, the mover 126 and other system parts. The operator instructs the controller 132, by means of the UI 144, to start the system 100 and to initialize it to acquire the image data ID from the object 102 to be imaged.

At step 260, if a certain parameter describing a condition of the system 100, a certain elapsed time after the previous calibration, or a number of performed imaging processes, which exceeds a predetermined limit, indicates a need to calibrate the system 100 after its initialization, the operator instructs the controller 132, by means of the UI 144, to carry out the calibration of the emitter(s) 104, receiver 124, and other relevant system parts by means of the calibration targer. Alternatively, the controller 132 initiavely (automatically) detects the need for the calibration when at least one previously described condition exceeds a predetermined limit value and carries out the calibration.

At step 262, the operator or the system 100 instructs the object 102, i.e a patient, to position or the operator positions the patient 102 between the emitter 104 and the receiver 124 as well as between the primary collimator 108, or the secondary collimator 110, and the receiver 124 as the previous figures present so that it is possible to irradiate the patient 102 by the emitter 104, to collimate the emitted X-rays 106 by the primary collimator 108 and possibly by the secondary collimator 110 depending on a used imaging operation, and to capture the image data ID from the irradiated patient 102 by the receiver 124.

The patient 102 is positioned by means positioner 120. The patient 102 carried out at least one of setting freely in accordance with the position indication, setting the ear rods 122 in the auditory canals, and supporting the nose against the nasio supporter 123.

At step 264, the operator selects whether it is used the one-shot or scanning imaging operation by instructing the controller 132, by means of the UI 144, to control the selector 116 to select a relevant aperture 112, 114 for the primary collimator 108 and the actuator 140 to actuate the distal Cephalometer 130 or the rotator depending on the selected imaging operation so that the secondary collimator 110 is positioned correctly with respect to the the selected imaging operation.

If the selected imaging operation in step 264 is the one-shot imaging operation, the controller 132 instructs the selector 116 to select a wider aperture 112, which is configured to the one-shot imaging operation, by adjusting the dimension of the aperture 112, if the primary collimator 108 comprises only single aperture 112, or by actuating the primary collimator 108 so that the wider one-shot aperture 112 is positioned correctly to the one-shot position OS as FIG. 1a presents, if the primary collimator 108 comprises multiple apertures 112, 114.

Additionally, if the system 100 is a single-emitter system, the controller 132 instructs the actuator 140 to control the supporter (rotator) 128 so that the emitter 104 and the selected aperture 112 are correctly positioned for the one-shot imaging operation, to control the Cephalometer 130 so that the secondary collimator 118 does not prevent or disturb the one-shot imaging operation, and to control the mover 126 so that the receiver 124 is correctly positioned and towards the emitter 104. If the system 100 is a multiple-emitter system, the controller 132 instructs the actuator 140 to control the rotator so that it is correctly positioned with respect to (over) the distal Cephalometer (positioner 120) and the secondary collimator 118 does not prevent or disturb, and to control the mover 126 so that the receiver 124 is correctly positioned and towards the emitter 104.

Alternatively, if the selected imaging operation in step 264 is the scanning imaging operation, the controller 132 instructs the selector 116 to select a narrower aperture 112, which is configured to the scanning imaging operation, by adjusting the dimension of the aperture 112, if the primary collimator 108 comprises only single aperture 112, or by actuating the primary collimator 108 so that the narrower scanning aperture 114 is positioned correctly to the scanning position SP as FIG. 1b presents, if the primary collimator 108 comprises multiple apertures 112, 114.

Additionally, if the system 100 is a single-emitter system, the controller 132 instructs the actuator 140 to control the supporter 128 so that the emitter 104 and the selected aperture 112, 114 are correctly positioned and ready for relevant scanning movements SC, to control the Cephalometer 130 so that the secondary collimator 118 is correctly positioned and ready for the relevant scanning movements SC, and to control the mover 126 so that the receiver 124 is correctly positioned, towards the emitter 104, and ready for the relevant scanning movements SC. If the system 100 is a multiple-emitter system, the controller 132 instructs the actuator 140 to control the distal emitter supporter 128 so that the emitter 104 and the selected aperture 112, 114 are ready for relevant scanning movements SC, to control the rotator so that the rotator and the secondary collimator 118 are correctly positioned with respect to the distal Cephalometer and ready for relevant scanning movements SC, and to control the mover 126 so that the receiver 124 is correctly positioned, towards the emitter 104 and ready for the relevant scanning movements SC.

At step 266, the operator or the system 100 instructs the controller 132, by means of the UI 144, to control the selected imaging operation to acquire the image data ID from the dentomaxillofacial of the positioned patient 102.

If the selected imaging operation is the one-shot imaging operation, the controller 132 instructs the emitter 104 to emit the X-rays 106 once so that the primary collimator 108 collimates the emitted X-rays 106, which penetrate (traverse) the relevant dentomaxillofacial area of the patient 102 at least partly, and the receiver 124 to receive the penetrated X-rays 106. The controller 132 further instructs the receiver 124 to generate the image data ID of the relevant area of the patient 102 on the grounds of the received X-rays 106. The emitter 104, primary collimator 108, and receiver 124 are stationary with respect to the object 102 (positioner 120, system 100) during the emission and reception of the X-rays 106.

If the selected imaging operation is the scanning imaging operation, the controller 132 instructs at least one of the emitter 104, the primary collimator 108, and the secondary collimator 110 and the receiver 124 to carry out the scanning movements SC. The controller 132 may instruct the actuator 140 to actuate the emitter 104 with the primary collimator 108 carry out the scanning movements SC sychronously together with the scanning movements SC of the secondary collimator 110 and the receiver 124. Alternatively, the controller 132 may instruct the actuator 140 to actuate only the emitter 104, not the primary collimator 108, to carry out the scanning movements SC sychronously together with the scanning movements SC of the secondary collimator 110 and the receiver 124. Alternatively, the controller 132 may instruct the actuator 140 to actuate only the primary collimator 108, not the emitter 104, to carry out the scanning movement SC sychronously together with the scanning movements SC of the secondary collimator 110 and the receiver 124. Alternatively, the controller 132 may instruct the actuator 140 to actuate the emitter 104 with the primary collimator 108 carry out the scanning movements SC sychronously together only with the scanning movements SC of the receiver 124, not the secondary collimator 110. In all options, these scanning movements SC are carried out with respect to the object 102. The controller 132 further instructs the emitter 104 to emit the X-rays 106 so that the primary and secondary collimators 108, 110 collimate the emitted X-rays 106, which penetrate the relevant area of the patient 102 at least partly, and the receiver 124 to receive the penetrated X-rays 106 during the previously described scanning movements SC. The controller 132 further instructs the receiver 124 to generate the image data ID of the relevant area of the patient 102 on the grounds of the received X-rays 106.

At step 268, the operator instructs the patient 102 to remove (exit) from the imaging position.

At step 270, after the acquisition of all necessary image data ID has been completed, the controller 132 forms the Cephalometric image of the relevant area by computing the image from the acquired image data ID.

The invention and its several advantages have now been described with reference to the previous exemplary embodiments. It is clear that the invention is not only restricted to these embodiments, but it comprises all possible embodiments within the scope of the following claims.

The invention claimed is:

1. An X-ray imaging system (100) for a Cephalometric dentomaxillofacial X-ray imaging operation, comprising
a controller (132),
an X-ray emitter (104) for emitting X-rays (106), primary and secondary collimators (108, 110) for collimating the X-rays,
an X-ray receiver (124) for receiving the X-rays from the emitter, and
a positioner (120) for positioning an object (102) to be imaged,
wherein the controller is configured to select (264) one of one-shot and scanning Cephalometric imaging operations and to control (266) the emitter to emit X-ray radiation (106) and the X-ray receiver (124) to receive the emitted radiation in order to acquire an X-ray image data (ID) in the selected imaging operation.

2. The imaging system according to claim 1, wherein the emitted radiation is collimated by the primary collimator (108) in the one-shot imaging operation and by the primary and secondary collimators in the scanning imaging operation.

3. The imaging system according to claim 1, wherein the primary collimator (108) comprises a one-shot aperture (112) to collimate the emitted radiation in the one-shot imaging operation and a scanning aperture (112, 114) that is narrower than the one-shot aperture to collimate together with the secondary collimator (110) the emitted radiation in the scanning imaging operation when the secondary collimator is located between the emitter and the positioned object so that the secondary collimator is closer to the positioned object than the emitter.

4. The imaging system according to claim 3, wherein the imaging system further comprises a selector (116) that is configured to select the one-shot aperture to a one-shot position (OS) in the one-shot imaging operation and the scanning aperture to a scanning position (SP) in the scanning imaging operation to collimate the emitted radiation.

5. The imaging system according to claim 4, wherein the controller is configured to control the selector to select the one-shot or scanning aperture of the primary collimator.

6. The imaging system according to claim 1, wherein the emitter, the primary collimator, and the receiver are stationary with respect to the object during the emission of the X-ray radiation in the one-shot imaging operation.

7. The imaging system according to claim 1, wherein the emitter, the primary collimator, and the secondary collimator move synchronously with respect to the object or the emitter is stationary and the primary and secondary collimators move synchronously with respect to the object during the emissions of the X-ray radiation in the scanning imaging operation.

8. The imaging system according to claim 7, wherein the receiver moves synchronously at least with the primary and secondary collimators with respect to the object during the emissions of the X-ray radiation in the scanning imaging operation.

9. The imaging system according to claim 1, wherein the imaging system further comprises a supporter (128) that is configured to support the emitter with respect to a structure of the system.

10. The imaging system according to claim 1, wherein the positioner comprises one or more ear rods (122) configured to position the object in the one-shot or scanning imaging operation, and where the positioner establishes a Cephalometer (130) to support the object in the one-shot or scanning imaging operation.

11. The imaging system according to claim 10, wherein the Cephalometer further comprises the receiver, the secondary collimator, and a nasio supporter (123) in the one-shot or scanning imaging operation when the supporter comprises a rotator (128) to which the emitter is supported.

12. The imaging system according to claim 1, wherein the imaging system further comprises a mover (126) that the controller is configured to control to move the receiver with respect to the emitter so that the receiver is perpendicularly towards the emitter during the emission of the X-ray radiation in the selected imaging operation.

13. The imaging system according to claim 1, wherein the primary collimator comprises at least one collimator.

14. The imaging system according to claim 1, further comprising a second X-ray emitter.

15. An X-ray imaging method (256) for a Cephalometric dentomaxillofacial X-ray imaging operation, comprising at least following steps of
controlling (266), by a controller (132), an X-ray emitter (104) to emit X-ray radiation (106) and
collimating (266), by at least one of primary and secondary collimators (108, 110), the emitted radiation,
wherein the method further comprises steps of selecting (264), by the controller, one of one-shot and scanning Cephalometric imaging operations and controlling (266), by the controller, an X-ray receiver (124) to receive the collimated radiation to acquire an X-ray image data (ID) in the selected imaging operation.

16. A (154) non-transitory computer readable medium comprising instructions, which, when executed by a controller (132), cause an X-ray imaging system (100) to carry out at least the steps of the method (256) according to claim 15.

* * * * *